United States Patent
Suumäki et al.

(10) Patent No.: US 6,615,269 B1
(45) Date of Patent: Sep. 2, 2003

(54) METHOD AND ARRANGEMENT FOR IMPLEMENTING CERTAIN NEGOTIATIONS IN A PACKET DATA NETWORK

(75) Inventors: Jan Suumäki, Tampere (FI); Tuomas Niemelä, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/502,271

(22) Filed: Feb. 11, 2000

(30) Foreign Application Priority Data

Feb. 16, 1999 (FI) .................................................. 990322

(51) Int. Cl.⁷ .............................................. G06F 15/16
(52) U.S. Cl. ........................ 709/230; 709/220; 709/228; 709/246; 370/395.4; 370/465; 370/395.21
(58) Field of Search ................................ 709/220, 228, 709/230, 246; 370/338, 395.4, 395.21, 465; 455/419

(56) References Cited

U.S. PATENT DOCUMENTS

| | | | | |
|---|---|---|---|---|
| 5,590,133 A | | 12/1996 | Billstrom et al. ............ 370/439 |
| 5,729,541 A | * | 3/1998 | Hamalainen et al. ........ 370/337 |
| 5,790,534 A | * | 8/1998 | Kokko et al. ................ 370/335 |
| 5,802,465 A | * | 9/1998 | Hamalainen et al. ........ 455/403 |
| 6,085,086 A | * | 7/2000 | La Porta et al. ............. 455/432 |
| 6,134,434 A | * | 10/2000 | Krishnamurthi et al. ..... 455/419 |
| 6,198,929 B1 | * | 3/2001 | Krishnamurthi et al. ..... 455/439 |
| 6,205,173 B1 | * | 3/2001 | Obradors et al. ............ 375/240 |
| 6,236,656 B1 | * | 5/2001 | Westerberg et al. ....... 370/395.4 |
| 6,434,133 B1 | * | 8/2002 | Hamalainen ................ 370/338 |
| 6,470,447 B1 | * | 10/2002 | Lambert et al. ............. 713/151 |
| 2003/0039237 A1 | * | 2/2003 | Forslow ..................... 370/352 |

* cited by examiner

*Primary Examiner*—Kenneth R. Coulter
*Assistant Examiner*—Hai V. Nguyen
(74) *Attorney, Agent, or Firm*—Perman & Green, LLP

(57) ABSTRACT

A method is disclosed for a mobile station (MS) for negotiating a set of Layer 3 parameters with a network device (NW) in association with the setup of a new Packet Data Protocol context. A request message (511) is created for requesting the setup of a new Packet Data Protocol context, and a set of suggested Layer 3 parameters (510) is inserted into the created request message. The request message is transmitted to the network device. After receiving from the network device a set of agreed Layer 3 parameters (514), they are employed within the new Packet Data Protocol context the setup of which was requested.

10 Claims, 5 Drawing Sheets

METHOD AND ARRANGEMENT FOR IMPLEMENTING CERTAIN NEGOTIATIONS IN A PACKET DATA NETWORK

TECHNOLOGICAL FIELD

The invention concerns generally the protocol structures that are used to arrange the communication between a mobile terminal and a packet-switched network. Especially the invention concerns the optimal composition of such structures and the arrangement of negotiations where the protocol-determined parameters relating to the communication are agreed upon.

BACKGROUND OF THE INVENTION

FIG. 1 illustrates the known data protocol stacks that are applied in a packet-switched communication connection where one end is a Mobile Station (MS) and the communication takes place over a GPRS network (General Packet Radio Service) through a Base Station Subsystem (BSS), a Serving GPRS Support Node (SGSN) and a Gateway GPRS Support Node (GGSN). The protocol layers where the peer entities are in the MS and the BSS are the physical layer 101 that employs the GSM cellular radio system (Global System for Mobile telecommunications), the Media Access Control (MAC) layer 102 and the Radio Link Control layer 103 which sometimes is regarded as only a part of the MAC layer 102—hence the dashed line between them. The protocol layers where the peer entities are in the BSS and the SGSN are the L1bis layer 104, the Network Service layer 105 and the BSS GPRS Protocol (BSSGP) layer 106.

The layers for which the peer entities are in the MS and the SGSN are the Logical Link Control (LLC) layer 107 and the SubNetwork Dependent Convergence Protocol (SNDCP) layer 108. It should be noted that only data or user plane protocols are shown in FIG. 1; a complete illustration of protocols would include the Layer 3 Mobility Management (L3MM) and Short Message Services (SMS) blocks on top of the LLC layer 107 in parallel with the SNDCP layer 108. Additionally there are the known Session Management (SM) and Radio Resource management (RR) entities that are not located on top of the LLC layer. At the interface between the SGSN and the GGSN there are the Layer 1 (L1) layer 109, the Layer 2 (L2) layer 110, a first Internet Protocol (IP) layer 111, the User Datagram Protocol/Transport Control Protocol (UDP/TCP) layer 112 and the GPRS Tunneling Protocol (GTP) layer 113. Between the MS and the GGSN there are the X.25 layer 114 and a second Internet Protocol layer 115. An application layer 116 in the MS will communicate with a peer entity that is located for example in another MS or some other terminal.

A typical negotiation that is required between peer entities in the mobile station and some of the fixed network devices is the eXchange IDentification or XID negotiation where the so-called L3CE (Layer 3 Compatibility Entity) parameters are agreed upon. L3CE as such is a protocol entity that is not separately shown in FIG. 1 but which will be located in the mobile station and either in a Radio Network Controller (RNC), a SGSN, or a GGSN on the network side for example as a part of or as a replacement to the SNDCP layer 108. The L3CE parameters will relate for example to the use of headers and data compression. The prior art method for arranging an XID negotiation is to insert the proposed L3CE parameters into certain messages on the LLC protocol layer and to use corresponding LLC-level answering messages to either acknowledge or reject the proposed L3CE parameters.

Proposals for the future UMTS (Universal Mobile Telecommunication System) have suggested similar protocol structures and negotiation arrangements for the communication between mobile stations, Radio Network Controllers (RNCs) and service nodes of packet-switched networks, with small changes or modifications in the designations of the devices, layers and protocols. It is typical to protocol structures like that in FIG. 1 that each layer has an exactly determined set of tasks to perform and an exactly determined interface with the next upper layer and the next lower layer. A certain amount of memory and processing power must be allocated in the devices taking part in the communication to maintain the layered structure and accomplish the tasks of each layer. It is therefore easily understood that the more complicated the structure of layered protocols, the more complicated the required software and hardware implementation. Complexity is disadvantageous in terms of costs incurred in design and manufacture and it increases the possibility of design errors. Additionally, in battery-driven mobile terminals it is a continual aim to reduce power consumption and diminish physical size, whereby a more simplified structure of protocol layers would create advantage.

SUMMARY OF THE INVENTION

It is therefore an object of the present invention to provide a method and arrangement that would accomplish the tasks of known communication protocol arrangements but with a simpler protocol structure.

The objects of the invention are accomplished by replacing certain parts of the protocol structure by transferring its functionalities to other parts of the protocol structure.

The method according to the first embodiment of the invention is characterised by that it comprises the steps of
    creating a request message for requesting the setup of a new Packet Data Protocol context,
    inserting into the created request message a set of suggested upper layer parameters,
    transmitting the request message to the network device,
    receiving from the network device a set of agreed upper layer parameters and
    employing the agreed upper parameters within the new Packet Data Protocol context the setup of which was requested.

The method according to the second embodiment of the invention is characterised by that it comprises the steps of
    creating an accept message for accepting a routing area update transmitted by the mobile station,
    inserting into the created accept message a set of suggested upper layer parameters,
    transmitting the accept message to the mobile station,
    receiving from the mobile station a set of agreed upper layer parameters and
    employing the agreed upper layer parameters within the Packet Data Protocol context which was subject to the handover.

The invention relates closely to the observation that the role of certain layers in many protocol structures is of minor practical value and is limited to certain measures for avoiding loss of data during a handover and exchanging certain parameters. This kind of layers may be completely omitted by combining their functions with suitable other existing parts of the protocol structure.

In the GPRS example presented in the description of prior art the protocol layer that can be omitted is the LLC layer.

We may note that the RLC layer is capable of performing all required error correction tasks over the radio interface in normal operation and the role of LLC has mainly been related to handovers between different BSCs (Base Station Controllers), where error-critical (but not delay-critical) data has needed a mechanism for avoiding loss of data. In the proposed UMTS a similar need has existed in handovers between different RNCs or SGSNs (often designated as 3GSGSNs or 3rd Generation SGSNs). A method and arrangement for removing this need had been presented in the co-pending Finnish patent application number 982531, rendering the error-correcting functions of the LLC layer superfluous.

The LLC layer has also had certain responsibilities such as flow control and XID negotiation mentioned in the description of prior art. According to the invention the exchange of the suggested L3CE parameters and corresponding acknowledgements and/or rejections is implemented in the so-called PDP (Packet Data Protocol) context messages that belong to the SM layer and routing area update messages that belong to the MM layer in the protocol structure.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
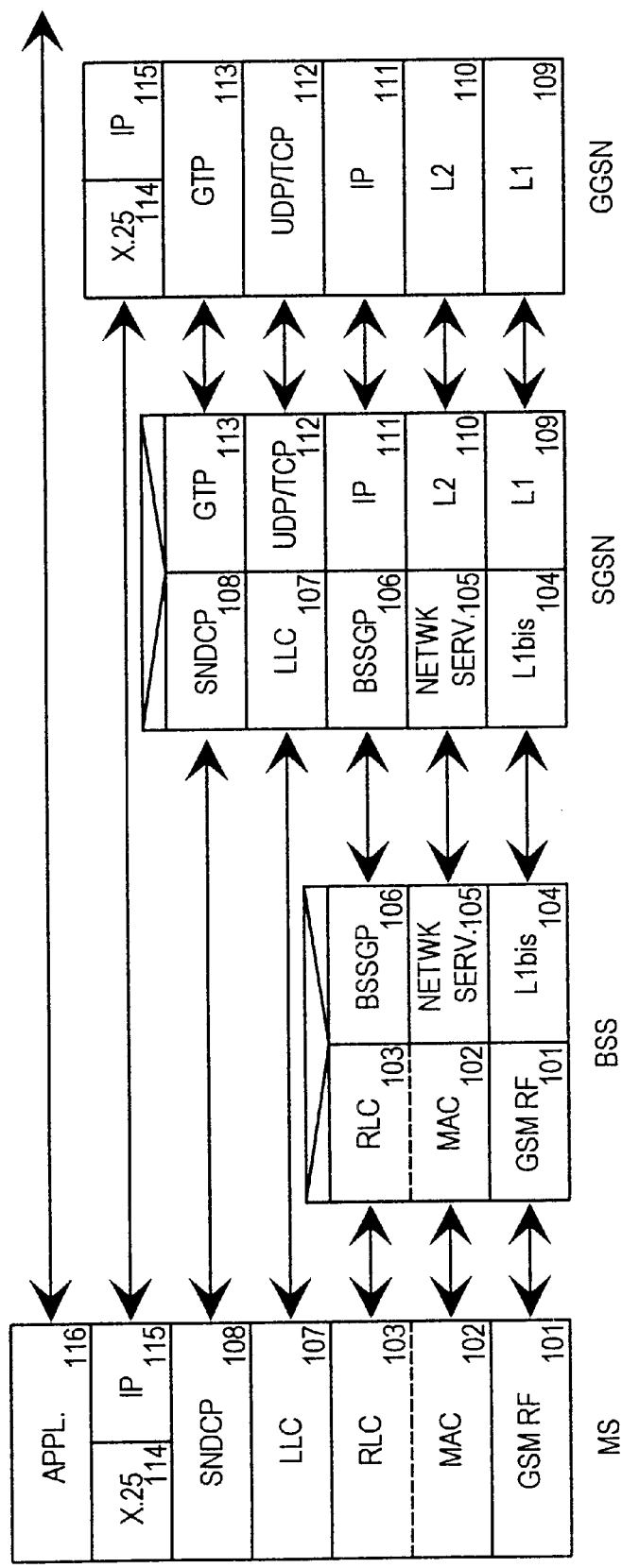
FIG. 1 illustrates the known protocol stacks in a GPRS implementation.

We will illustrate the applicability of the invention in connection with the known GPRS system. However, the presented examplary embodiments do not limit the applicability of the invention to any specific system, and indeed the invention is very advantageously applicable for example to the future third generation digital cellular networks. As additional background to the invention we will first consider some known characteristics of the GPRS system.

The general packet radio service (GPRS) is a new service to the GSM system, and is one of the objects of the standardization work of the GSM phase 2+ at the ETSI (European Telecommunications Standards Institute). The GPRS operational environment comprises one or more subnetwork service areas, which are inter-connected by a GPRS backbone network. A subnetwork comprises a number of packet data service nodes (SN), which in this application will be referred to as serving GPRS support nodes (SGSN), each of which is connected to the mobile telecommunications system in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network (PSDN), via GPRS gateway support nodes (GGSN). The GPRS service thus allows to provide packet data transmission between mobile data terminals and external data networks when the appropriate parts of a mobile telecommunications system function as an access network.

In order to access the GPRS services, a MS shall first make its presence known to the network by performing a GPRS attach. This operation makes the MS available for SMS (Short Message Services) over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach procedure. In order to send and receive GPRS data, the MS shall activate the packet data address that it wants to use, by requesting a PDP context activation procedure, where PDP comes from Packet Data Protocol. This operation makes the MS known in the corresponding GGSN, and interworking with external data networks can commence. More particularly a PDP context is created in the MS and the GGSN and the SGSN. The PDP context defines different data transmission parameters, such as the PDP type (e.g. X.25 or IP), PDP address (e.g. X.121 address), quality of service (QoS) and NSAPI (Network Service Access Point Identifier). The MS activates the PDP context with a specific message, Activate PDP Context Request, in which it gives information on the TLLI, PDP type, PDP address, required QoS and NSAPI, and optionally the access point name (APN).

The quality of service defines how the packet data units (PDUs) are handled during the transmission through the GPRS network. For example, the quality of service levels defined for the PDP addresses control the order of transmission, buffering (the PDU queues) and discarding of the PDUs in the SGSN and the GGSN, especially in a congestion situation. Therefore, different quality of service levels will present different end-to-end delays, bit rates and numbers of lost PDUs, for example, for the end users.

Currently the GPRS allows for only one QoS for each PDP context. Typically a terminal has only one IP address, so conventionally it may request for only one PDP context. There is recognised the need for modifying the existing systems so that a PDP context could accommodate several different QoS flows. For example, some flows may be associated with E-mail that can tolerate lengthy response times. Other applications cannot tolerate delay and demand a very high level of throughput, interactive applications being one example. These different requirements are reflected in the QoS. Intolerance to delay must usually be associated with a relatively good tolerance for errors; correspondingly a very error-critical application must allow for long delays, because it is impossible to predict how many retransmission attempts it will take to achieve the required high level of correctness. If a QoS requirement is beyond the capabilities of a PLMN, the PLMN negotiates the QoS as close as possible to the requested QoS. The MS either accepts the negotiated QoS, or deactivates the PDP context.

Current GPRS QoS profile contains five parameters: service precedence, delay class, reliability, and mean and peak bit rates. Service precedence defines some kind of priority for the packets belonging to a certain PDP context. Delay class defines mean and maximum delays for the transfer of each data packet belonging to that context. Reliability in turn specifies whether acknowledged or unacknowledged services will be used at LLC (Logical Link Control) and RLC (Radio Link Control) layers. In addition, it specifies whether protected mode should be used in case of unacknowledged service, and whether the GPRS backbone should use TCP or UDP to transfer data packets belonging to the PDP context. Furthermore, these varying QoS parameters are mapped to four QoS levels available at the LLC layer.

Figure 2:
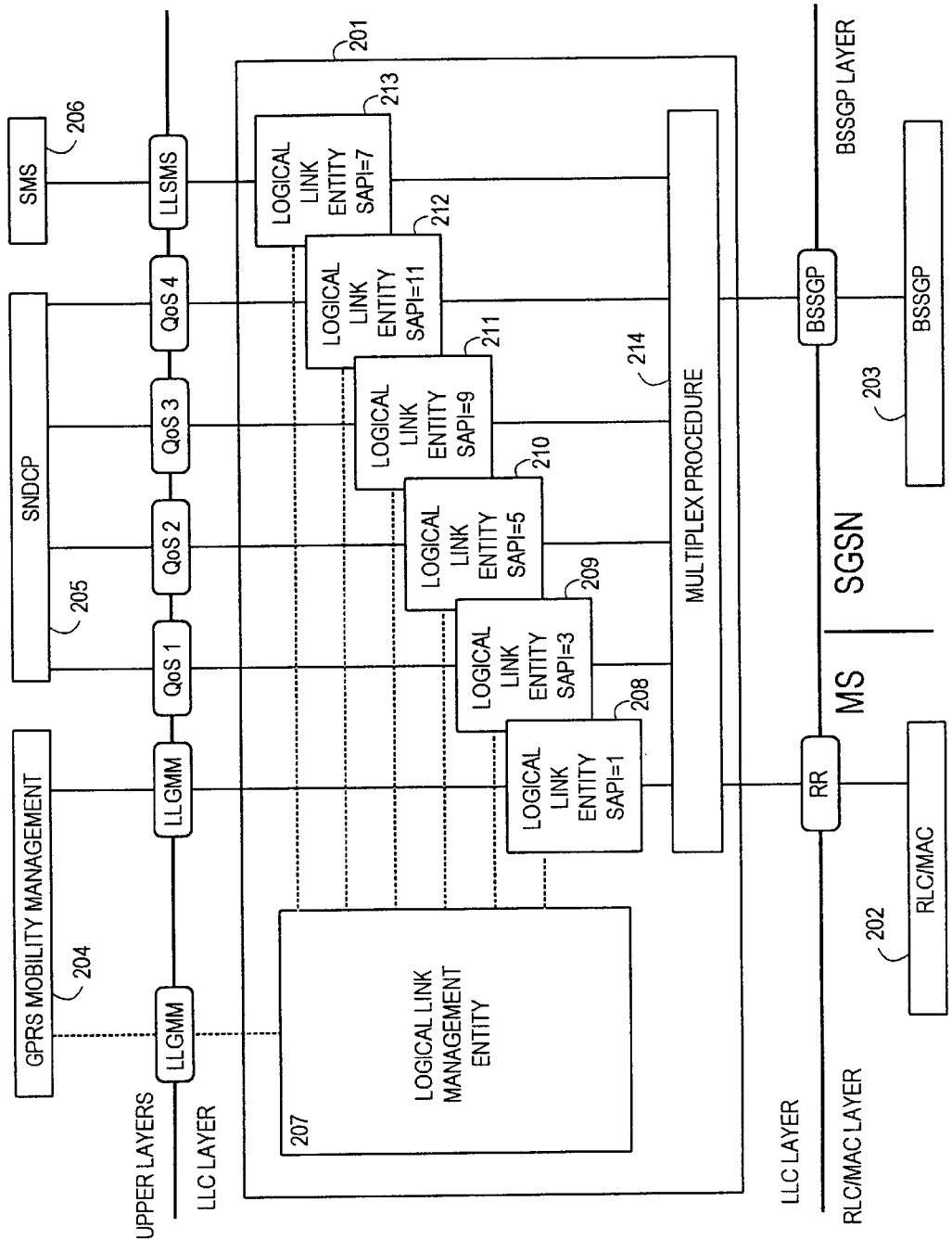
FIG. 2 illustrates the known functional model of an LLC layer.

FIG. 2 is a functional model of a known LLC protocol layer 201, corresponding to the blocks 107 in FIG. 1. Block 202 represents the known lower layer (RLCIMAC; Radio Link Control/Media Access Control) functions that are located below the LLC layer 201 in the protocol stack of a mobile station MS. Correspondingly block 203 represents the known lower layer (BSSGP) functions that are located below the LLC layer 201 in a serving GPRS support node SGSN. The interface between the LLC layer 201 and the RLC/MAC layers 202 is called the RR interface and the interface between the LLC layer 201 and the BSSGP layers 203 is called the BSSGP interface.

Above the LLC layer there are the known GPRS Mobility Management functions 204 (also known as the Layer 3 Mobility Management functions or L3MM), SNDCP functions 205 and Short Messages Services functions 206. Each one of these blocks has one or more interfaces with the LLC layer 201, connecting to its different parts. The Logical Link Management Entity 207 has an LLGMM control interface (Logical Link—GPRS Mobility Management) with block 204. Mobility management data is routed through a LLGMM data interface between block 204 and the first Logical Link Entity 208 of the LLC layer. The second 209, third 210, fourth 211 and fifth 212 Logical Link Entities connect to block 205 through the corresponding interfaces; according to the QoS levels handled by each of the Logical Link Entities the interfaces are known as QoS 1, QoS 2, QoS 3 and QoS 4. The sixth Logical Link Entity 213 of the LLC layer connects to block 206 via an LLSMS interface (Logical Link—Short Messages Services). The Service Access Point Identifiers or SAPIs of the first 208, second 209, third 210, fourth 211, fifth 212 and sixth 213 Logical Link Entities are respectively 1, 3, 5, 9, 11 and 7. Each one of them is connected inside the LLC layer to a multiplexing block 214, which handles the connections through the RR interface to block 202 and further towards the mobile station as well as the connections through the BSSGP interface to block 203 and further towards the SGSN. The connection between the multiplexing block 214 and the lower layer block 202 in the direction of the MS may be described as a "transmission pipe".

Figure 3:
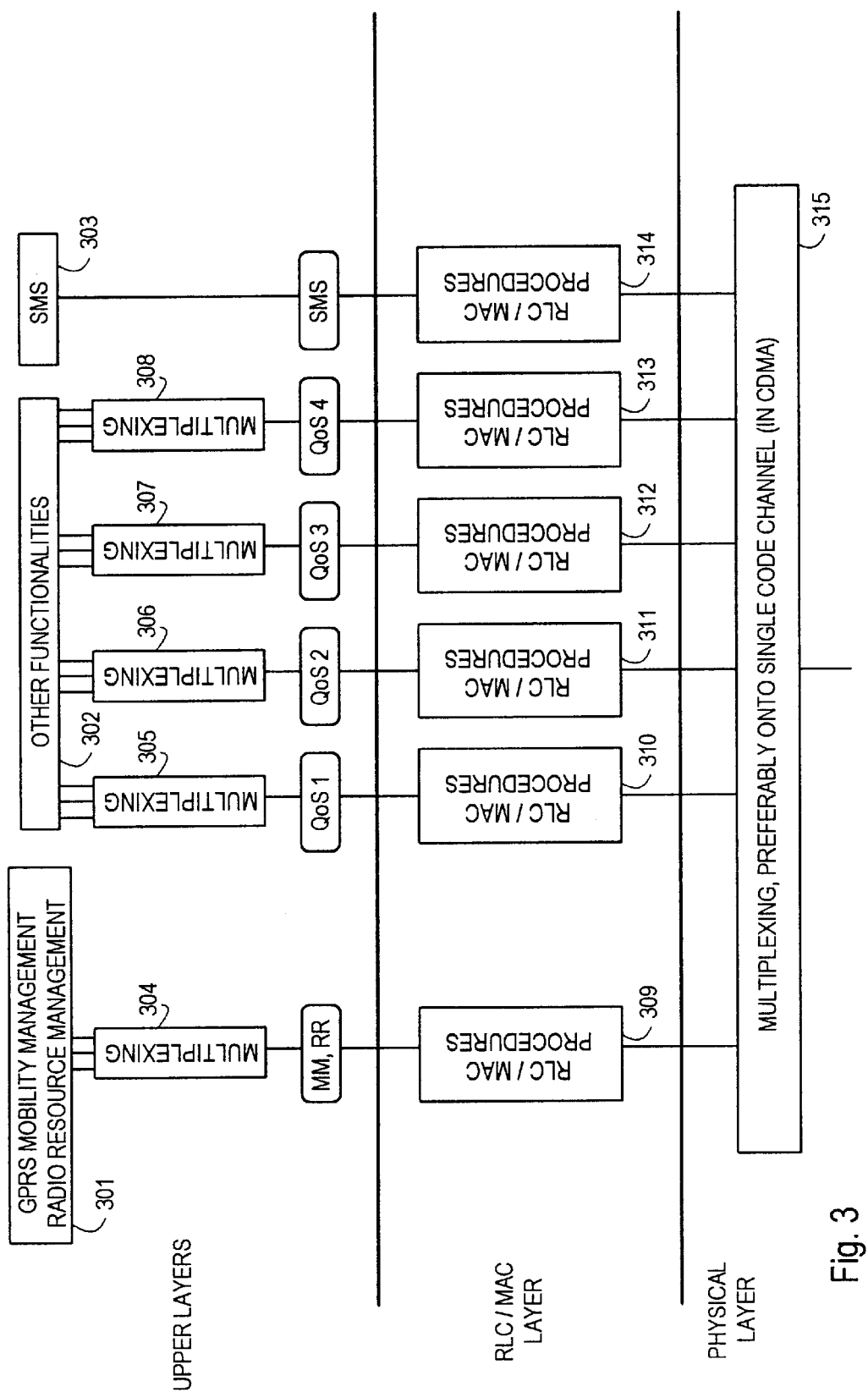
FIG. 3 illustrates a functional model that would replace the LLC layer according to the invention.

FIG. 3 illustrates an arrangement according to the invention where the LLC layer has been completely omitted. The upper layers comprise a MM/RR part 301 for known mobility and radio resource management, an SMS part 303 for processing data related to short messages, as well as a part 302' for processing the received data and data to be transmitted according to other functionalities. "Local" multiplexing/demultiplexing is performed at the upper layers in blocks 304 to 308 so that there is only one transmission pipe for control information between the MM/RR part 301 and the lower layers, one transmission pipe for SMS-related information between the SMS part 303 and the lower layers, and one transmission pipe for each quality of service class between the other functionalities part 302 and the lower layers. Multiplexing is shown in FIG. 3 as taking place in separate functional blocks; however, it may be an inherent part of for example one or several functionalities in the other functionalities part 302.

The RLC/MAC layer is located directly under the upper layers in FIG. 3. It performs the known RLC/MAC functions for each flow of information for which there is a connection between it and the upper layers. The MAC functions consist of procedures for sharing the common radio channels between mobile stations as well as allocations and disallocations of dedicated radio channels. The RLC functions comprise the composing and decomposing of RLC blocks, detecting corrupted RLC blocks and arranging for the retransmission of corrupted blocks when appropriate. In UMTS the the concept of an RLC unit is unidirectional and reserved for one information flow only, so the widely interpreted RLC layer in the protocol structure will accommodate a pair of RLC units for each active flow of information. The multiplexing and demultplexing of the RLC blocks belonging to different flows of information takes place on the physical layer, which is represented by block 315 in FIG. 3. In a spread spectrum system it is advantageous to multiplex all flows of information related to a certain mobile terminal onto a single code channel. From the published standardisation work of the UMTS there is known a physical layer that is applicable to perform the operations represented by block 315.

FIG. 3 as such is only applicable to the mobile station, because there is an RLC/MAC layer under the higher-order layers. However, it is easy to generalise the arrangement of FIG. 3 so that there may be a BSSGP layer under the higher-order layers, resulting in an arrangement applicable to a SGSN. Also in that case there must be an additional stage of multiplexing/demultiplexing at the physical level, like block 315 in FIG. 3.

Figure 4:
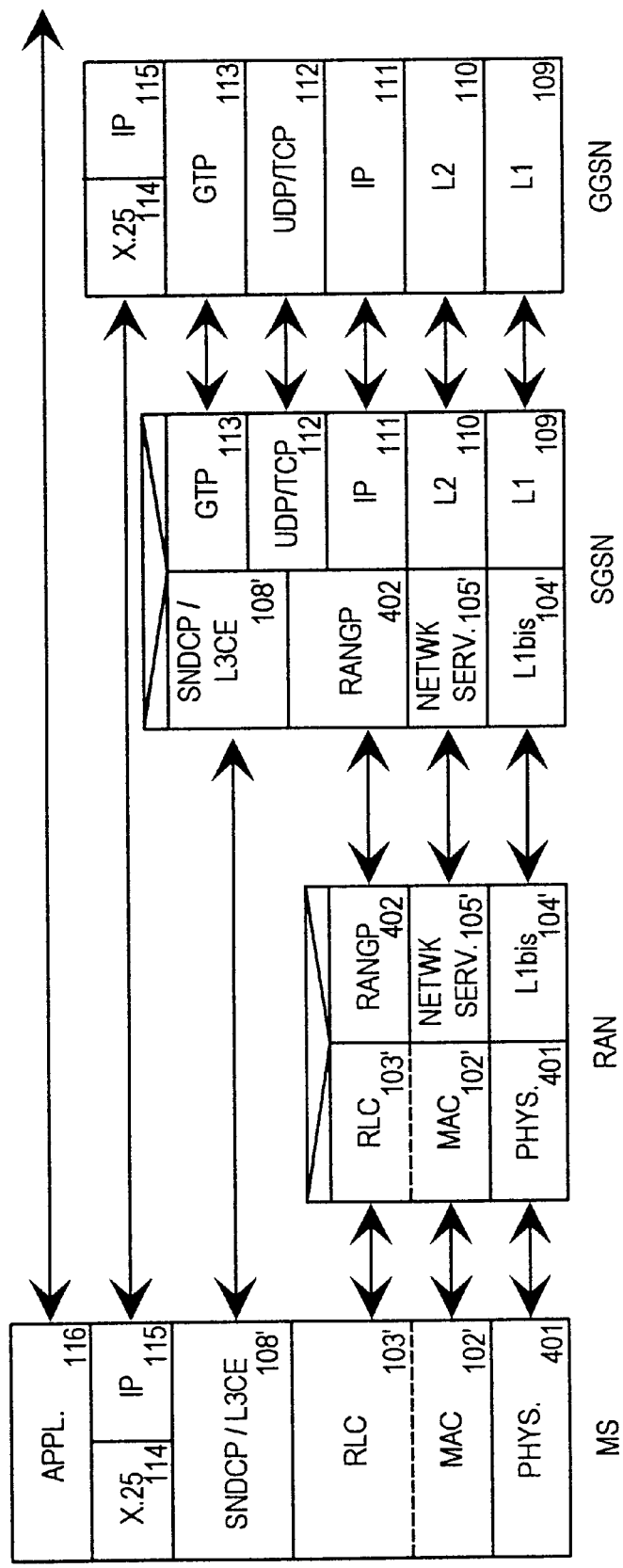
FIG. 4 illustrates an arrangement of protocol stacks according to the invention.

FIG. 4 illustrates the inventive structure of protocol stacks which is comparable to the known arrangement of FIG. 1. It is noted that there is no LLC layers in the mobile station or the SGSN, the physical layer between the mobile station and the RAN has been replaced by a UMTS physical layer 401, the BSSGP layer between the RAN and the SGSN has been replaced by a corresponding UMTS layer preliminarily known as the RANGP (RAN GPRS Protocol) layer 402, and the MAC, RLC, SNDCP, Network Service and L1bis layers have been adapted according to the guidelines given above in association with FIG. 3. The SNDCP layer may also be called the L3CE layer as illustrated in FIG. 4.

Figure 5:
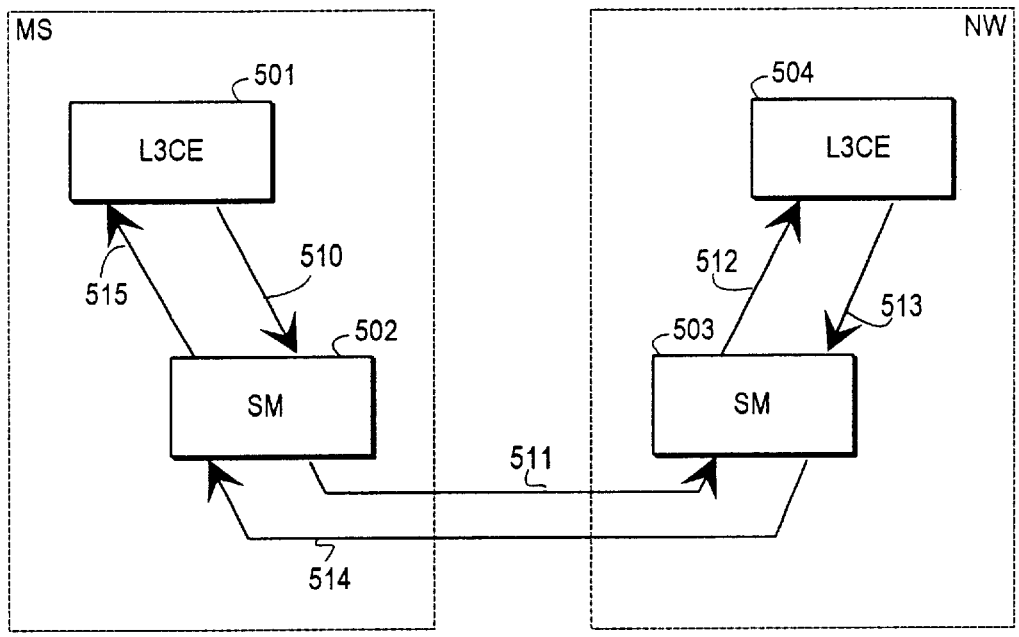
FIG. 5 illustrates an exchange of messages according to a certain embodiment of the invention and FIG. 6 illustrates an exchange of messages according to a certain other embodiment of the invention.

Next we will describe the use of PDP context messages as vehicles of the XID negotiation according to an advantageous embodiment of the invention. FIG. 5 is a simplified schematic illustrating the protocol entities in a Mobile Station (MS) and a NetWork (NW) that have an active role in the activation of a new PDP context. At step 510 the L3CE entity 501 of the MS asks the local Session Management (SM) entity 502 to set up a new PDP context having certain QoS parameters. According to the invention the same request will contain the L3CE parameters which the L3CE entity of the MS would like to be used in association with the new PDP context. At step 511 the SM entity of the MS will transmit to the network a request for creating a new PDP context; if the notation of GPRS is used, step 511 corresponds to the transmission of an "Activate PDP context request" message. It will contain the L3CE parameters which the L3CE entity gave to the SM entity in the MS.

When the PDP context activation request reaches the network element where the peer entity to the MS's L3CE entity 504 is operative, the local SM entity 503 will extract the L3CE parameters and forward them to the L3CE entity according to step 512. According to the known principle of negotiation the network side L3CE will answer with a set of acceptable L3CE parameters at step 513; the parameters in the answer may have the same values or there may be one or more different values than what the L3CE entity received. At step 514 the network side SM entity will transmit the negotiation result to the MS; again if the notation of GPRS is used, step 514 corresponds to the transmission of an "Activate PDP context accept" message. At step 515 the SM entity 502 of the MS forwards the negotiation result to the local L3CE entity 501.

For clarity, all of the activities pertaining to PDP context activation and performed at the network side before transmission of the negotiation result at step 514, are not described in this specification. Only details pertaining to the inventive method are described here.

The local information transfer between the protocol entities of a single device takes place through so-called primitives. The primitives referred to in the description above in association with steps 510, 512, 513 and 515 could be called for example the "Create_New_PDP_Context_req( )", "XID_ind( )", "XID_rsp( )" and "Create_New_PDP_Context_cnf( )" primitives respectively.

Preferably, the L3CE parameters are common to all PDP contexts of a single MS. In an advantageous embodiment of the invention, the L3CE parameters are transmitted in signalling associated with one of the PDP contexts of the MS.

Figure 6:
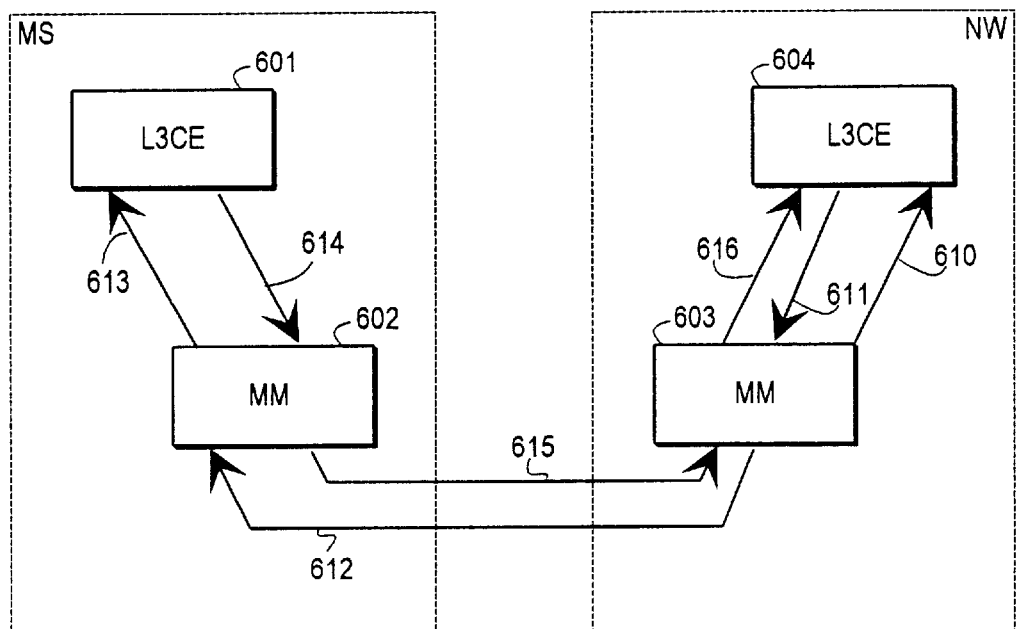

In association with a handover the L3CE parameters must be re-negotiated if the handover results in a change of the peer L3CE entity on the network side. We will assume that the change of the peer L3CE entity on the network side will be associated with a change in Routing Area so that the re-negotiation of the L3CE parameters may be implemented within the exchange of Routing Area Update messages known as such. FIG. 6 illustrates the correponding active entities in the MS and in the NW; the latter refer especially to the entities in the new SGSN or other network device that will have the MS on its responsibility after the handover. The active entities on the MS side are the L3CE entity 601 and the MM (Mobility Management) entity 602 and on the NW side the correponding peer MM entity 603 and peer L3CE entity 604.

At step 610 the NW side MM entity 603 requests the current L3CE parameters from the local L3CE entity 604 either directly as in FIG. 6 or through a certain SM entity (not shown). The L3CE entity 604 responds at step 611 by giving the current L3CE parameters. At step 612 the NW side MM entity 603 transmits to its peer entity 602 in the MS a message (in GPRS notation: the Routing Area Update Accept message) indicating the current XID parameters, and at step 613 these are forwarded locally to the MS side L3CE entity 601. According to the negotiation principle the L3CE entity 601 of the MS will insert at step 614 the acceptable parameter values into a primitive that is passed to the local MM entity 602, and at steps 615 and 616 these are forwarded first to the NW side MM entity 603 and consequtively to the NW side L3CE entity 604.

Again if we devise names for the primitives at steps 610, 611, 613, 614 and 616, they could advantageously be Request_XID( ), XID_req( ), XID_indo, XID_rsp( ) and XID_cnf( ) respectively.

An alternative to the use of PDP context and Routing Area update messages is to create some messages for direct logical communication between peer L3CE entities and to use these messages to negotiate the L3CE parameters. The above-described use of additions to existing messages has the advantageous feature of not requiring the specification of completely new messaging arrangements in an already complicated set of specifications.

A comparison between FIGS. 1 and 4, with the help of FIGS. 2 and 3, may be used to describe a mobile station and a network device according to the invention. It is known as such that the advantageous implementation of the protocol stacks in mobile stations and network devices is in the form of microprocessor-executable computer programs stored in memory devices. By applying the teachings of the present patent application it is within the capabilities of a person skilled in the art to realise, instead of the protocol structures illustrated in FIGS. 1 and 2, the protocol structures according to FIGS. 3 and 4 so that the mobile stations and network devices with such an implementation will operate according to the present invention.

In this specification, the higher layer parameters being transmitted with PDP context messages and routing area update messages according to the invention have been referred to as L3CE parameters. This notation is used only for clarity and convenience, since this notation is commonly used in the art. However, the invention is not limited to implementing of these parameters in Layer 3, since they can be implemented in other higher protocol layers as well, such as in Layer 2. Therefore, these parameters denoted as L3CE parameters are in the following claims referred to as upper layer parameters.

What is claimed is:
1. A method for a mobile station for negotiating a set of upper layer parameters with a network device, comprisinges the steps of
  creating a request message for requesting the setup of a new Packet Data Protocol context,
  inserting into the created request message a set of suggested upper layer parameters,
  transmitting the request message to the network device,
  receiving from the network device a set of agreed upper layer parameters and
  employing the agreed upper parameters within the new Packet Data Protocol context the setup of which was requested.
2. A method according to claim 1, wherein the step of inserting into the created request message a set of suggested upper layer parameters comprises inserting into the created request message a set of Layer 3 parameters, and the step of receiving from the network device a set of agreed upper layer parameters comprises receiving from the network device a set of Layer 3 parameters.
3. A method according to claim 1, wherein the step of inserting into the created request message a set of suggested upper layer parameters comprises inserting into the created request message a set of L3CE parameters, and the step of receiving from the network device a set of agreed upper layer parameters comprises receiving from the network device a set of L3CE parameters.
4. A method according to claim 1, wherein the step of inserting into the created request message a set of suggested upper layer parameters comprises inserting into the created request message a set of upper layer parameters that are common to all Packet Data Protocol contexts of the mobile station.
5. A method for a network device for negotiating a set of upper layer parameters with a mobile station, comprising the steps of creating an accept message for accepting a routing area update transmitted by the mobile station, inserting into the created accept message a set of suggested upper layer parameters, transmitting the accept message to the mobile station, receiving from the mobile station a set of agreed upper layer parameters and employing the agreed upper layer parameters within the Packet Data Protocol context which was subject to the negotiation.

6. A method according to claim 5, additionally comprising the step of providing said set of suggested upper layer parameters from an upper layer protocol entity to a mobility management protocol entity before inserting them in the created accept message.

7. A method according to claim 5, wherein said step of receiving from the mobile station a set of agreed upper layer parameters comprises extraction of said parameters from a received routing area update complete message.

8. A method according to claim 5, wherein each set of upper layer parameters is a set of Layer 3 parameters.

9. A method according to claim 5, wherein each set of upper layer parameters is a set of L3CE parameters.

10. A method according to claim 5, wherein said set of upper layer parameters is common to all Packet Data Protocol contexts of the mobile station.

* * * * *